United States Patent Office 3,592,936
Patented July 13, 1971

3,592,936
METHOD OF TREATMENT USING PHARMACEUTICAL COMPOSITION CONTAINING DIMETHYL SULFOXIDE
Arnold D. Marcus, Livingston, N.J., and Robert E. Dempski, Dresher, Pa., assignors to Merck & Co., Inc., Rahway, N.J.
No Drawing. Continuation-in-part of application Ser. No. 508,826, Nov. 19, 1965. This application Apr. 25, 1969, Ser. No. 827,456
Int. Cl. A61j 3/04; A61k 9/06
U.S. Cl. 424—337
2 Claims

ABSTRACT OF THE DISCLOSURE

This invention relates to a method of administering liquid dimethyl sulfoxide cutaneously and topically to humans and animals in amounts effective for therapeutic action without having the dimethyl sulfoxide run off the skin and without causing significant irritation of the skin.

The method involves administering to the surface of the skin an ionicly sensitive, semi-solid gel of (i) a mixture of dimethyl sulfoxide and water in the ratio from about 50%/50% to not more than 95%/5% by weight, (ii) carboxy polymethylene water soluble resin in an amount from about 0.1% to about 1.0% by weight of the gel composition, and (iii) a neutralizing agent selected from the group consisting of monoisopropanolamine, diisopropanolamine, triethanolamine and triethylamine in an amount from about 0.01% to about 0.3% by weight of the gel composition, with the lower concentrations of neutralizing agent being employed with the lower concentrations of resins; and then maintaining the semi-solid gel in contact with the skin for a period sufficient to enable the salt normally present at the surface of the skin to gradually break the semi-solid gel composition and thereby slowly release the liquid mixture of dimethyl sulfoxide and water over the surface of the skin where the semi-solid gel was applied.

CROSS REFERENCE TO RELATED APPLICATION

This is a continuation-in-part of application Ser. No. 508,826 filed Nov. 19, 1965, now abandoned.

BACKGROUND OF THE INVENTION

In the cutaneous and topical application of dimethyl sulfoxide—which is a liquid when it is at a temperature above about 18° C. or 65° F.—the most effective treatment usually involves (a) the application of dimethyl sulfoxide not only to the area of the disorder being treated, but also to an area surrounding the site of the disorder, and it also usually involves (b) the application of sufficient dimethyl sulfoxide to those areas to render the skin dripping wet, and the maintenance of those areas uncovered until the skin has dried—a matter of about 30 minutes. This regimen is somewhat inconvenient in many situations. In addition, it is dangerous to the patient's clothing, for if the dimethyl sulfoxide spills from the bottle, or runs off the skin, onto the patient's clothing, the solvent properties of the dimethyl sulfoxide may cause permanent damage to the part of the clothing onto which it spills or runs, especially if the clothing is fabricated from some types of synthetic material.

SUMMARY OF THE INVENTION

An object of this invention is to incorporate dimethyl sulfoxide into a pharmaceutical composition that will be more convenient to use, particularly in cutaneous and topical applications of dimethyl sulfoxide, than either liquid dimethyl sulfoxide itself or a liquid solution of dimethyl sulfoxide and water or other diluent.

A second object is to provide that, in such a pharmaceutical composition of dimethyl sulfoxide, (a) the action of dimethyl sulfoxide is not impaired; (b) the concentration of dimethyl sulfoxide obtainable in the composition is not so low as to render the composition relatively ineffective in therapeutic action; (c) the pharmaceutical composition is easily applicable on wet or dry lesions and is not tacky; and (d) no objectionable consequence follows that can be attributed to the use or presence of an ingredient in the composition other than the dimethyl sulfoxide.

A third object is to provide a pharmaceutical composition which not only achieves the foregoing two objects, but additionally possesses the desirable characteristics of stability, of pharmaceutical elegance, of being relatively simple to make, of requiring a relatively small amount of additive, and of being readily adaptable to making compositions having a wide range of concentrations of dimethyl sulfoxide.

According to this invention, a liquid mixture of dimethyl sulfoxide and water having a concentration of dimethyl sulfoxide from about 50 percent to not more than about 95 percent, by weight, has dispersed therein, by means of agitation, a small amount of a water soluble resin identified by its manufacturer, on the label for the material, as carboxy polymethylene (the resin being one of those made and sold by the B. F. Goodrich Chemical Company of Cleveland, Ohio under the trademark "Carbopol"), the amount of such resin being from about 0.1% to about 1.2% by weight of the total composition. To the resulting mixture (which is acidic) is added, while the mixture is mildly agitated, a neutralizing agent selected from the group consisting of monoisopropanolamine, diisopropanolamine, triethanolamine and triethylamine, the amount of such neutralizing agent never exceeding the amount of such resin and usually being smaller in amount, ranging from about 0.01% to about 0.3% by weight of the total composition.

The resulting composition is a smooth gel sufficiently viscous to be easily spread upon the skin of humans without the composition running off the skin, which is heat stable for temperatures encountered during normal storage of pharmaceutical preparations, which contains a concentration of dimethyl sulfoxide high enough to be medically effective, which contains a very small quantity of ingredients other than dimethyl sulfoxide and its aqueous diluent, which is non-irritating to the skin, and which does not impair, upon application to the skin, the effectiveness of the dimethyl sulfoxide content of the composition upon the area treated.

Among the conditions for which this method may be useful in some patients is the treatment of some acute musculoskeletal disorders, including bursitis.

It is evident that the quantity of the described gel composition of dimethyl sulfoxide that is to be used for one application varies according to the size of the area to be treated, and that the frequency of such application is limited by the tolerance of the skin to such gel composition. These are matters within the competence of the physician to determine and vary, particularly in view of his experience with, or information available to him on, the use of liquid dimethyl sulfoxide. As an initial guide, it is recommended that the quantity used upon a hand be from 2 to 3 cc., upon an elbow be approximately 5 cc., upon a shoulder or knee be 8 cc., and upon a back be from 10 to 15 cc. As an initial guide as to frequency, it is recommended that the applications be made three times a day in acute situations and twice a day in chronic situations.

The dimethyl sulfoxide used is preferably a purified grade, and not the technical grade generally available for use as a solvent. In preparing the purified grade, much of the impurities present in the technical grade are removed, particularly of those impurities causing the material to have a color and to possess a characteristic oyster-like odor. Various methods of purification are available, if only the technical grade is available. These include fractional distillation, solvent extraction and freezing. One specific method of purification by solvent extraction is disclosed in U.S. application Ser. No. 351,538 filed Mar. 12, 1964, which was superceded by a continuation-in-part application that matured into U.S. Pat. 3,358,036. The purified grade preferably has an ultraviolet absorption at 275 m$\mu$ of not more han 0.10 and is essentially odorless and colorless.

The resins used in accordance with this invention are more specifically described by the manufacturer of the resins (B. F. Goodrich Chemical Company, a division of The B. F. Goodrich Company) as carboxyl vinyl polymers of extremely high molecular weight having the physical properties of a dry, fluffy powder with a density of about 13 lbs. per cubic foot, and a specific gravity of about 1.41, the polymer being in an acid form so that when a 1% aqueous solution is prepared with it, the solution has a pH of about 3.

While the precise composition of these resins is not directly revealed by their manufacturer, it is believed that they are within the scope of the polymers described and claimed in one or both of the following U.S. patents granted to the B. F. Goodrich Company: 2,798,053 granted July 2, 1957 on application filed September 3, 1952; and 2,985,625 granted May 23, 1961 on application filed Jan. 18, 1954.

It is also believed that the general method for making gels with these "Carbopol" resins is disclosed in U.S. Pat. No. 2,923,692 granted to the B. F. Goodrich Company on Feb. 2, 1960 on application filed Jan. 25, 1954.

It is believed, particularly from the disclosures contained in U.S. Pats. Nos. 2,909,462; 2,912,358 and 3,027,303 granted to Bristol-Myers Company, that the resin known as "Carbopol" 934 is a colloidally water-soluble polymer of acrylic acid crosslinked with approximately 1% by weight of allyl sucrose, the latter material having an average of about 5.8 allyl groups per molecule.

It is believed, particularly from analyses made of these resins, that the resins known as "Carbopol" 940 and "Carbopol" 941 have the same constituents as the resin known as "Carbopol" 934, and in approximately the same proportions, the differences between these resins being apparently due to different degrees of polymerization.

The manufacturer of these "Carbopol" resins, in its technical literature, distinguishes between these resins by graphs plotting viscosities against concentration of the resins in water, and summarizes the differences as follows:

"Carbopol" 934—To produce thick formulations such as heavy gels, emulsions and suspensions use Carbopol 934. This thickening action is employed in cosmetic, oral and topical pharmaceutical formulations and industiral products. Carbopol 934 gives permanent stability at high viscosity.

"Carbopol" 940—Created for the cosmetic industry, Carbopol 940 forms clear, sparkling water or water-alcohol gels. This polymer is the key to a completely new class of cosmetics with unusual esthetic appeal. It has excellent thickening efficiency at high viscosities. In many applications its efficiency is superior to that of Carbopol 934.

"Carbopol" 941—Permanent emulsions and suspensions are obtained at relatively low viscosities with Carbopol 941—even in ionic systems. It does not provide as much viscosity at high concentrations as to Carbopol 934 and 940, but Carbopol 941 produces appreciable viscosities at extremely low concentrations.

Of the three resins described, the two designated as "Carbopol" 934 and "Carbopol" 940 are much preferred in the practice of this invention over the resin designated as "Carbopol" 941, for the latter resin requires an appreciably higher percentage content of resin and of neutralizing agent, relative to those effective with the preferred resins, to obtain a gel having equal body or viscosity.

The resin designated as "Carbopol" 940 produces a clearer gel than the gel obtained from the resin designated as "Carbopol" 934. However, as toxicity data for the resin designated as "Carbopol" 934 is currently more complete than it is for the resin designated as "Carbopol" 940, the current resin of choice is that designated as "Carbopol" 934.

Two valuable characteristics of the dimethyl sulfoxide-containing gels produced by the resins designated as "Carbopol" 934 and "Carbopol" 940 are the fact that such gels are non-irritating to the skin, and that being less resistant to ionic deswelling than gells resulting from the use of the resin designated as "Carbopol" 941, such gells gradually "degel" or "break" upon contact with the salt present at the surface of the skin, thereby gradually releasing liquid dimethyl sulfoxide from the gel for its normal, desired action upon the area over which the gel was applied.

DESCRIPTION OF THE PREFERRED EMBODIMENTS (Except as to Example 7, which is stated as an unsatisfactory embodiment)

The following examples (excluding Example 7, as noted above), illustrate specific embodiments of the invention, and it is to be understood that such examples are not to be considered as limiting the invention.

EXAMPLE 1

Ingredients:
  Dimethyl sulfoxide—purified—100 ml.
  Distilled water—99 ml.
  Carboxy polymethylene resin ("Carbopol" 940)—1 gm.
  Neutralizing agent (monoisopropanolamine)—0.1 ml.

The water is mixed with the dimethyl sulfoxide, and then the resin is added to the liquid mixture while it is subjected to vigorous agitation so as to disperse the resin in the liquid mixture. The neutralizing agent (monoisopropanolamine) is then added while the mixture is subjected to mild agitation, the agitation being mild so as to avoid introducing air into the mixture while the mixture becomes a gel.

The resulting composition, in gel form, contains dimethyl sulfoxide (DMSO) in the amount of 50%, "Carbopol" 940 in the amount of 0.5% and monoisopropanolamine (MIPA) in the amonut of 0.05%, by weight. The resulting composition is a smooth, clear gel that is easily applicable to the skin, that does not run off the skin, and that is non-irritating to the skin. It also is stable and does not change in form or appearance when separate samples are stored for one year at 5° C., room temperature, and 37° C., respectively.

EXAMPLE 2

Ingredients:
  Dimethyl sulfoxide—purified—100 ml.
  Distilled water—99 ml.
  Carboxy polymethylene resin ("Carbopol" 934)—1.5 gm.
  Neutralizing agent (monoisopropanolamine)—0.2 ml.

The mixing procedure is the same as in Example 1.

The resulting composition, in gel form, contains dimethylsulfoxide (DMSO) in the amount of 50%, "Carbopol" 934 in the amount of 0.75% and monoisopropanolamine (MIPA) in the amount of 0.10% by weight. The resulting composition is a smooth, somewhat hazy gel that is easily applicable to the skin, that does not run off the skin, and that is nonirritating to the skin. It also is stable and did not change in form or appearance when separate samples are stored for one year at 5° C., room temperature, and 37° C., respectively.

EXAMPLE 3

Ingredients:
- Dimethyl sulfoxide—purified—70% w./w.
- Distilled water—30% w./w.
- Carboxy polymethylene resin ("Carbopol" 940)—0.1%
- Neutralizing agent (monoisopropanolamine) — 0.01%

The mixing procedure is the same as in Example 1.

The resulting composition is a smooth, clear gel that is easily applicable to the skin and that is non-irritating to the skin. However, its viscosity is lower than that of the compositions of Examples 1 and 2, so that it has less tendency not to run off the skin.

An acute dermal irritation test was made of this composition. Six albino rabbits (3 female and 3 male) had their hair removed from the dorsal area with electric clippers. Two sites on each animal were selected. One site was abraded by cross-hatching minor incisions through the superficial layers of the skin. The other site was allowed to remain intact. A dose of 2.0 ml. of the test sample was applied to each site and the area covered with a guaze patch. The entire trunk was then wrapped with an occlusive material for 24 hours. The wrapping was removed and the test sites examined after 24 hours. They were then not rewrapped. The sites were re-examined once daily for 7 days.

Four of six abraded sites showed very slight erythema at 24 hours, appearing normal after 48 hours and thereafter. The other two abraded sites appeared normal at 24 hours, showed a very slight erythema at 48 hours, and then normal at 72 hours and thereafter. Intact sites appeared normal throughout.

EXAMPLE 4

Ingredients:
- Dimethyl sulfoxide—not purified—150 ml.
- Distilled water—49 ml.
- Carboxy polymethylene resin ("Carbopol" 940)—1 gm.
- Neutralizing agent (monoisopropanolamine)—0.1 ml.

The mixing procedure is the same as in Example 1.

The resulting composition, in gel form, contains dimethyl sulfoxide (DMSO) in the amount of 75%, "Carbopol" 940 in the amount of 0.5% and monoisopropanolamine (MIPA) in the amount of 0.05%, by weight. The resulting composition is a smooth, clear gel that is easily applicable to the skin, that does not run off the skin, and that is almost completely non-irritating to the skin. It also is stable and does not change in form or appearance when separate samples are stored for one year at 5° C., room temperature and 37° C., respectively.

EXAMPLE 5

Ingredients:
- Dimethyl sulfoxide—purified—76 gm.
- Distilled water—23 gm.
- Carboxy polymethylene resin ("Carbopol" 940)—1 gm.
- Neutralizing agent (monoisopropanolamine)—0.1 ml.

The mixing procedure is the same as in Example 1.

The resulting composition, in gel form, contains dimethyl sulfoxide in the amount of 76%, "Carbopol" 940 in the amount of 1.0% and monoisopropanolamine (MIPA) in the amount of 0.1% by weight. The resulting composition is a smooth, clear gel that is easily applicable to the skin, that does not run off the skin, and that is non-irritating to the skin.

EXAMPLE 6

Ingredients:
- Dimethyl sulfoxide—purified—90% w./w.
- Distilled water—10% w./w.
- Carboxy polymethylene resin ("Carbopol" 940)—0.1%
- Neutralizing agent (monoisopropanolamine)—0.01%

The mixing procedure is the same as in Example 1.

The resulting composition is a smooth, clear gel that is easily applicable to the skin and that is substantially non-irritating to the skin. However, its viscosity is lower than that of the compositions of Examples 1 and 2, so that it has less tendency not to run off the skin.

An acute dermal irritation test was made of this composition, in the same manner as described in Example 3.

Four or six abraded sites showed a very slight erythema when examined after 24 hours. After 48 hours three of these four sites appeared normal. The remaining one of these four sites was normal at 72 hours. One intact skin site showed slight erythema at 24 hours, but normal at 48 hours and thereafter. All other sites, abraded and intact, appeared normal throughout.

For a control, a dimethyl sulfoxide/water solution in the ratio of 90%/10% by weight was applied to six other rabbits in the same manner as described in Example 3. One of six abraded sites showed a very slight erythema at 24 hours and 48 hours, and then normal at 72 hours and thereafter. All other sites, abraded and intact, appeared normal throughout.

EXAMPLE 7

Ingredients:
- Dimethyl sulfoxide—purified—199 ml.
- Carboxy polymethylene ("Carbopol" 940)—1 gm.
- Neutralizing agent (monoisopropanolamine)—0.1 ml.

The resin is dispersed in the liquid dimethyl sulfoxide with agitation, and then the neutralizing agent (monoisopropanolamine) is added, with mild agitation, while the mixture becomes a gel.

The resulting composition, in a smooth, clear gel form, contains dimethyl sulfoxide (DMSO) in the amount of 99.5%, "Carbopol" 940 in the amount of 0.5%, and monoisopropanolamine (MIPA) in the amount of 0.05%, by weight. However, the gel is highly irritating when applied to the skin, which becomes very dry. Also, the gel, when stored at 5° C. for one week, becomes opaque, and remains so at the end of the second week. This composition is considered unsatisfactory.

EXAMPLE 8

Ingredients:
- Dimethyl sulfoxide—purified—348.25 gms.
- Distilled water—149.25 gms.
- Carboxy polymethylene resin ("Carbopol" 941)—2.5 gms.
- Neutralizing agent (monoisopropanolamine)—0.3 ml.

The mixing procedure is the same as in Example 1.

The resulting composition contains dimethyl sulfoxide (DMSO) in the amount of 70%, "Carbopol" 941 in the amount of 0.5%, and monoisopropanolamine (MIPA) in the amount of 0.06%, by weight. It is an almost clear, but rather fluid, gel.

EXAMPLE 9

Ingredients:
- Dimethyl sulfoxide—purified—70% w./w.
- Distilled water—30% w./w.
- Carboxy polymethylene resin ("Carbopol" 940)—0.5%
- Neutralizing agent (diisopropanolamine)—0.1%

The mixing procedure is the same as in Example 1.

The resulting composition is a smooth gel that is easily applicable to the skin, that does not run off the skin, and that is non-irritating to the skin.

EXAMPLE 10

In this example the only difference from Example 9 is that "Carbopol" 934 is used in place of "Carbopol" 940. The resulting composition is a smooth gel that is easily applicable to the skin, that does not run off the skin, and that is non-irritating to the skin.

EXAMPLE 11

Ingredients:
- Dimethyl sulfoxide—purified—70% w./w.
- Distilled water—30% w./w.
- Carboxy polymethylene resin ("Carbopol" 940—) 0.5%
- Neutralizing agent (triethanolamine)—0.12%

The mixing procedure is the same as in Example 1.

The resulting composition is a smooth gel that is easily applicable to the skin, that does not run off the skin, and that is non-irritating to the skin.

EXAMPLE 12

Ingredients:
- Dimethyl sulfoxide—purified—70% w./w.
- Distilled water—30% w./w.
- Carboxy polymethylene resin ("Carbopol" 934)—0.5%
- Neutralizing agent (triethanolamine)—0.1%

The mixing procedure is the same as in Example 1.

The resulting composition is a smooth gel that is easily applicable to the skin, that does not run off the skin, and that is non-irritating to the skin.

EXAMPLE 13

Ingredients:
- Dimethyl sulfoxide—purified—70% w./w.
- Distilled water—30% w./w.
- Carboxy polymethylene resin ("Carbopol" 940)—0.5%
- Neutralizing agent (triethylamine)—0.15%

The mixing procedure is the same as in Example 1.

The resulting composition is a smooth gel that is easily applicable to the skin, that does not run off the skin, and that is non-irritating to the skin.

EXAMPLE 14

Ingredients:
- Dimethyl sulfoxide—purified—70% w./w.
- Distilled water—30% w./w.
- Carboxy polymethylene resin ("Carbopol" 934)—0.5%
- Neutralizing agent (triethylamine)—0.1%

The mixing procedure is the same as in Example 1.

The resulting composition is a smooth gel that is easily applicable to the skin, that does not run off the skin, and that is non-irritating to the skin.

EXAMPLES 15–19

The ingredients of the compositions of these examples are as set forth in the following table:

| Ex. | Dimethyl sulfoxide (purified), percent | Distilled water, percent | "Carbopol" 934, percent | Triethanolamine, percent | Brookfield viscosity, cps. |
|---|---|---|---|---|---|
| 15 | 50 | 50 | 0.4 | 0.264 | 35,000 |
| 16 | 60 | 40 | 0.45 | 0.21 | 34,000 |
| 17 | 70 | 30 | 0.45 | 0.167 | 29,000 |
| 18 | 80 | 20 | 0.72 | 0.12 | 29,000 |
| 19 | 90 | 10 | 0.95 | 0.108 | 30,000 |

The mixing procedure is the same as in Example 1.

The resulting composition of each example is a smooth gel that is easily applicable to the skin, that does not run off the skin, that has the Brookfield viscosity indicated in the table, and that is non-irritating to the skin.

These viscosity measurements are made with a Brookfield viscosimeter, model HAF, using a number 6 spindle at 10 r.p.m.

EXAMPLE 20

Ingredients:
- Dimethyl sulfoxide—purified—70% w./w.
- Distilled water—30% w./w.
- Carboxy polymethylene resin ("Carbopol" 934)—1.05%
- Neutralizing agent (monoisopropanolamine)—As per table below.

The mixing procedure is the same as in Example 1.

The resulting composition in each case is a smooth gel that is easily applicable to the skin, that is non-irritating to the skin, that has the Brookfield viscostiy indicated in the table below, and that has the physical appearance as indicated in the table below:

| Percent MIA (monoisopropanolamine) | Brookfield viscosity (cps.) | Physical appearance |
|---|---|---|
| 0.01 | 6,000 | Very hazy. |
| 0.05 | 43,000 | Do. |
| 0.10 | 63,000 | Do. |
| 0.15 | 79,000 | Trace of haze. |
| 0.25 | 92,000 | Do. |
| 0.30 | 100,000 | Do. |

These viscosity measurements are made with a Brookfield viscosimeter, model HAF, using a number 6 spindle at 10 r.p.m.

The composition containing 0.01% monoisopropanolamine is not satisfactory in providing a composition that does not run off the skin. Preferably such a composition has a Brookfield viscosity of at least 10,000 cps. measured in the manner indicated. Each of the other compositions listed in the table of this example has the characteristic of not running off the skin.

EXAMPLE 21

Ingredients:
- Dimethyl sulfoxide—purified—70% w./w.
- Distilled water—30% w./w.
- Carboxy polymethylene resin ("Carbopol" 940)—1.05%.
- Neutralizing agent (monoisopropanolamine)—As per table below.

The mixing procedure is the same as in Example 1.

The resulting composition in each case is a smooth gel that is easily applicable to the skin, that is nonirritating to the skin, that does not run off the skin, that has the Brookfield viscosity indicated in the table below, and that has the physical appearance as indicated in the table below:

| Percent MIA (monoisopropanolamine) | Brookfield viscosity (cps.) | Physical appearance |
|---|---|---|
| 0.01 | 14,000 | Very hazy. |
| 0.05 | 72,000 | Trace of haze. |
| 0.10 | 100,000 | Clear. |

These viscosity measurements are made with a Brookfield viscosimeter, model HAF, using a number 6 spindle at 10 r.p.m.

In packaging the compositions of this invention, consideration must be given to the solvent properties of the dimethyl sulfoxide, so that ingredients in the container, or its cover or cap, are not leached out by the dimethyl sulfoxide, to the detriment of the purity of the composition. A simple package is an amber colored glass container having a polyethylene-lined white urea cap.

If it is desired to package the compositions in a squeezable tube, they may be placed in a tube made of low density polyethylene, such as the polyethylene sold by the E. I. du Pont de Nemours & Co., of Wilmington, Del., under the designation "Alathon" 2020. Preferably this tube has an epoxy coating to serve as a moisture barrier. A suitable coating of this character is that applied by the Thatcher Glass Manufacturing Co., Inc. of New York, N.Y., under the designation Downs process No. 1002. The cap for the tube is made of linear polyethylene, such as that sold by the Phillips Chemical Company of New York, N.Y., under the designation "Marlex" No. 5040.

SUMMARY OF EXAMPLES

The following table summarizes the foregoing examples (the liquid diluent being distilled water in each case):

(a) applying to the surface of the skin at and surrounding the site of the disorder being treated an ionicly sensitive, semi-solid gel consisting essentially of
   (i) a mixture of dimethyl sulfoxide and water in the ratio from about 50%/50% to not more than 95%/5%, by weight,
   (ii) carboxy polymethylene water soluble resin in amount from about 0.1% to about 1.0% by weight of the gel composition and,
   (iii) a neutralizing agent selected from the group consisting of monoisopropanolamine, diisopropanolamine, triethanolamine and triethylamine in an amount from about 0.01% to about 0.3% by weight of the gel composition; and with the lower concentrations of neutralizing agent being employed with the lower concentrations of resin; and (b) maintaining said semi-solid gel in contact with said skin for a period sufficient to enable the salt normally present at the surface of the skin to gradually break the semi-solid gel composition and thereby slowly release the liquid mixture of dimethyl sulfoxide and water over the surface of the skin where the semi-solid gel was applied.

2. The method of administering liquid dimethyl sul-

| Example No. | Percent content of DMSO (w./w.) | Percent content of Carbopol resin | Specific Carbopol resin | Percent content neutralizing agent | Identification of neutralizing agent | Is gel stated as non-irritating to skin |
|---|---|---|---|---|---|---|
| 1 | 50 | 0.5 | 940 | 0.05 | MIPA | Yes. |
| 2 | 50 | 0.75 | 934 | 0.10 | MIPA | Yes. |
| 3 | 70 | 0.1 | 940 | 0.01 | MIPA | Yes. |
| 4 | 75 | 0.5 | 940 | 0.05 | MIPA | Yes. |
| 5 | 76 | 1.0 | 940 | 0.1 | MIPA | Yes.[1] |
| 6 | 90 | 0.1 | 940 | 0.01 | MIPA | Yes.[2] |
| 7 | 99.5 | 0.5 | 940 | 0.05 | MIPA | No.[3] |
| 8 | 70 | 0.5 | 941 | 0.06 | MIPA | Not stated. |
| 9 | 70 | 0.5 | 940 | 0.1 | DIPA | Yes. |
| 10 | 70 | 0.5 | 934 | 0.1 | DIPA | Yes. |
| 11 | 70 | 0.5 | 940 | 0.12 | TEA | Yes. |
| 12 | 70 | 0.5 | 934 | 0.1 | TEA | Yes. |
| 13 | 70 | 0.5 | 940 | 0.15 | TEthylA | Yes. |
| 14 | 70 | 0.5 | 934 | 0.1 | TEthylA | Yes. |
| 15 | 50 | 0.4 | 934 | 0.264 | TEA | Yes. |
| 16 | 60 | 0.45 | 934 | 0.21 | TEA | Yes. |
| 17 | 70 | 0.45 | 934 | 0.167 | TEA | Yes. |
| 18 | 80 | 0.72 | 934 | 0.12 | TEA | Yes. |
| 19 | 90 | 0.95 | 934 | 0.108 | TEA | Yes. |
| 20 | 70 | 1.05 | 934 | 0.01–0.30 | MIPA | Yes. |
| 21 | 70 | 1.05 | 940 | 0.01–0.10 | MIPA | Yes. |

[1] Almost completely.
[2] Substantially.
[3] Is highly irritating.

NOTE.—MIPA=monoisopropanolamine; TEA=triethanolamine; DIPA=diisopropanolamine; TEthylA=triethylamine.

We claim:

1. A method of administering liquid dimethyl sulfoxide cutaneously and topically to humans and animals in amounts effective for therapeutic action in acute musculoskeletal disorders without having the dimethyl sulfoxide run off the skin and without causing significant irritation of the skin, said method comprising:

oxide as set forth in claim 1, in which the resin is a colloidally water-soluble polymer of acrylic acid crosslined with approximately 1% by weight of allyl sucrose, the latter material having an average of about 5.8 allyl groups per molecule.

(References on following page)

References Cited

UNITED STATES PATENTS 3,011,950  12/1961  Mehaffey ........... 424—81

FOREIGN PATENTS 655,363  10/1965  Republic of South Africa.
644,613  3/1964  Belgium.
644,614  3/1964  Belgium.
644,615  3/1964  Belgium.

OTHER REFERENCES

Rosenbaum, E.E. et al., Northwest Med. 63: 167–168, March 1964.

Brown, J. H., Ind. Med. Surg. 35: 777–781, September 1966.

Brown, J. H., Annals N.Y. Acad. Sciences 131(1): 496–505, Mar. 15, 1967.

Federal Register 33(176): 12776–12777, Sept. 10, 1968.

Fitzpatrick, Drug & Cosmetic Industry 96(2): 254, February 1965.

Marson Bull. Chimicofarm, 102: 109–124, February 1963.

SHEP K. ROSE, Primary Examiner

U.S. Cl. X.R.

424—81

Notice of Adverse Decision in Interference

In Interference No. 100,525, involving Patent No. 3,592,936, A. D. Marcus and R. E. Dempski, METHOD OF TREATMENT USING PHARMACEUTICAL COMPOSITION CONTAINING DIMETHYL SULFOXIDE, final judgment adverse to the patentees was rendered November 13, 1981, as to claim 1.

[*Official Gazette February 23, 1982.*]